(12) United States Patent
Collazo Gomez et al.

(10) Patent No.: US 10,493,946 B2
(45) Date of Patent: *Dec. 3, 2019

(54) METHOD OF FOLDING AN AIRBAG, AIRBAG, AIRBAG MODULE AND VEHICLE SAFETY SYSTEM

(71) Applicant: Dalphi Metal Espana S.A., Vigo (ES)

(72) Inventors: Angel Collazo Gomez, Vigo (ES); Ramon Bana Castro, Vigo (ES)

(73) Assignee: DALPHI METAL ESPANA S.A., Vigo (ES)

( * ) Notice: Subject to any disclaimer, the term of this patent is extended or adjusted under 35 U.S.C. 154(b) by 36 days.

This patent is subject to a terminal disclaimer.

(21) Appl. No.: 15/629,780

(22) Filed: Jun. 22, 2017

(65) Prior Publication Data

US 2017/0369027 A1 Dec. 28, 2017

(30) Foreign Application Priority Data

Jun. 27, 2016 (DE) .................... 10 2016 007 749

(51) Int. Cl.
| | |
|---|---|
| *B60R 21/237* | (2006.01) |
| *B60R 21/203* | (2006.01) |
| *B60R 21/2338* | (2011.01) |
| *B60R 21/01* | (2006.01) |
| *B60R 21/239* | (2006.01) |
| *B60R 21/276* | (2006.01) |

(52) U.S. Cl.
CPC .......... *B60R 21/237* (2013.01); *B60R 21/01* (2013.01); *B60R 21/2035* (2013.01); *B60R 21/239* (2013.01); *B60R 21/2338* (2013.01); *B60R 21/276* (2013.01); *B60R 2021/0104* (2013.01); *B60R 2021/01286* (2013.01)

(58) Field of Classification Search
CPC ........................... B60R 21/237; B60R 21/203
See application file for complete search history.

(56) References Cited

U.S. PATENT DOCUMENTS

| | | | | |
|---|---|---|---|---|
| 5,520,408 | A * | 5/1996 | Niederman | B60R 21/203 280/728.1 |
| 5,803,483 | A * | 9/1998 | Lunt | B60R 21/237 280/728.1 |
| 6,092,839 | A * | 7/2000 | Nagano | B60R 21/237 280/743.1 |
| 6,176,509 | B1 * | 1/2001 | Kawaguchi | B60R 21/237 280/728.1 |
| 6,206,409 | B1 | 3/2001 | Kato et al. | |
| 6,286,866 | B1 * | 9/2001 | Satge | B60R 21/237 280/743.1 |
| 6,299,202 | B1 * | 10/2001 | Okada | B60R 21/233 280/732 |

(Continued)

*Primary Examiner* — Faye M Fleming
(74) *Attorney, Agent, or Firm* — Tarolli, Sundheim, Covell & Tummino LLP

(57) ABSTRACT

A method of folding an airbag for a driver airbag module having a front airbag layer connected at least in portions to a rear airbag layer includes flatly spreading the airbag onto a support surface so that the front airbag layer comes to rest on the rear airbag layer. Each of a left-hand lateral airbag portion and a right-hand lateral airbag portion is zigzag folded multiple times in the direction of a longitudinal axis of the airbag. Each of an upper airbag portion and a lower airbag portion is furled in the direction of a transverse axis of the airbag.

20 Claims, 5 Drawing Sheets

(56) References Cited

U.S. PATENT DOCUMENTS

| | | | | |
|---|---|---|---|---|
| 6,471,238 B2* | 10/2002 | Ishikawa | ........... | B60R 21/21656 |
| | | | | 280/728.3 |
| 6,547,279 B1 | 4/2003 | Amamori | | |
| 6,945,557 B2* | 9/2005 | Takimoto | .............. | B60R 21/206 |
| | | | | 280/730.1 |
| 7,445,239 B2* | 11/2008 | Okada | ................... | B60R 21/237 |
| | | | | 280/743.1 |
| 7,571,933 B2* | 8/2009 | Thomas | ................ | B60R 21/203 |
| | | | | 280/743.1 |
| 8,540,276 B2* | 9/2013 | Schneider | ............. | B60R 21/206 |
| | | | | 280/730.1 |
| 8,960,713 B2* | 2/2015 | Kim | ...................... | B60R 21/206 |
| | | | | 280/730.1 |
| 9,227,591 B2* | 1/2016 | Sano | ..................... | B60R 21/205 |
| 9,656,625 B2* | 5/2017 | Jung | ..................... | B60R 21/206 |
| 2005/0134032 A1* | 6/2005 | Downing | ............. | B60R 21/237 |
| | | | | 280/743.1 |
| 2006/0055157 A1 | 3/2006 | Ishiguro et al. | | |
| 2018/0056923 A1* | 3/2018 | Kang | ................. | B60R 21/2338 |

* cited by examiner

METHOD OF FOLDING AN AIRBAG, AIRBAG, AIRBAG MODULE AND VEHICLE SAFETY SYSTEM

RELATED APPLICATION

This application claims priority from German Application No. 10 2016 007 749.2, filed Jun. 27, 2016, the subject matter of which is incorporated herein by reference in its entirety.

BACKGROUND OF THE INVENTION

The invention relates to a method of folding an airbag, especially for a driver airbag module, comprising a front airbag layer which is connected at least in portions to a rear airbag layer. Apart from that, the invention relates to a folded airbag and an airbag module as well as a vehicle safety system comprising said airbag.

Occupant restraint systems for automotive vehicles usually include airbag modules comprising an airbag which in the case of impact is inflated so as to reduce the probability of body parts of a vehicle occupant colliding with a vehicle component. Some of these airbag modules are provided for being fixed in the steering wheel of an automotive vehicle as a driver airbag module. Accordingly, the airbag is arranged in a casing of the airbag module in a folded state, wherein it is especially important that the folded airbag, i.e. the airbag package, occupies a minimum volume. It is further important that in the case of release the airbag can deploy in a spilt second. Hence the development of new folding techniques of airbags alms at folding the airbag to an as small size as possible so as to minimize the storage space required while ensuring unhindered deployment of the airbag.

SUMMARY OF THE INVENTION

It is the object of the invention to state a method alternative to known methods which enables an airbag to be folded, especially an as small volume as possible of a folded airbag to be produced. Furthermore it is to be ensured by the method that in a case of crash the airbag can freely deploy and inflate, preferably in a directed manner. It is also an object of the invention to provide such folded airbag and an airbag module as well as a vehicle safety system comprising such folded airbag.

In accordance with the invention, this object is achieved with respect to the method of folding an airbag by the subject matter of claim 1, with respect to the folded airbag by claim 4 or 5, with respect to the airbag module by the subject matter of claim 9 and with respect to the vehicle safety system by the subject matter of claim 10.

The invention is based on the idea to state a method of folding an airbag which is designed especially for a driver airbag module comprising a front airbag layer which is connected at least in portions to a rear airbag layer, the method comprising the following steps of:
a) flatly spreading the airbag onto a support surface so that the front airbag layer comes to rest on the rear airbag layer,
b) folding, especially zigzag folding, at least in portions each of a left-hand lateral airbag portion and a right-hand lateral airbag portion in the direction of a longitudinal axis of the airbag,
c) furling each of an upper airbag portion and a lower airbag portion in the direction of a transverse axis of the airbag.

The advantage of the method according to the invention consists in the fact that a reproducible folding of an airbag can be achieved by method steps that are easy to carry out. Moreover, the invention provides a method in which the airbag can be folded into an especially small volume, as no means such as compressed air have to be introduced to the airbag. In addition, the method enables a directed inflating behavior of the airbag to be obtained.

The front airbag layer is the layer of the airbag which in the inflated state faces the vehicle occupant and especially the driver. The rear airbag layer is the airbag layer of the airbag which in the inflated state faces the vehicle components and especially the instrument panel.

The front airbag layer is connected, especially stitched and/or welded, at least in portions to the rear airbag layer.

In step a) this arrangement of front and rear airbag layers is flatly spread on a support surface. For example a table or a desk may serve as a support surface. The airbag is spread on the support surface so that the front airbag layer comes to rest on the rear airbag layer. The person folding the airbag consequently looks onto the front airbag layer, whereas the rear airbag layer rests on the support surface.

When spreading the airbag flatly onto a support surface, care has to be taken that during folding no big forces are applied to seams intended to tear in the inflated state.

In step b) there follows folding at least in portions, especially zigzag folding, of each of a left-hand lateral airbag portion and a right-hand lateral airbag portion in the direction of a longitudinal axis of the airbag. In this context, it is applicable that the left-hand lateral airbag portion and the right-hand lateral airbag portion are resulting from a top view onto the airbag, i.e. when the airbag is viewed by a person folding the same. The longitudinal axis of the airbag extends from the top to the bottom in the described top view.

In step c) each of the upper airbag portion and the lower airbag portion is furled in the direction of a transverse axis of the airbag. The upper airbag portion is the upper airbag portion which is visible in a top view onto the airbag. The lower airbag portion is the lower segment of the airbag visible in a top view onto the airbag. The transverse axis of the airbag extends from the left to the right in a top view, i.e. when the airbag is viewed by the person folding the airbag.

The longitudinal axis and the transverse axis are preferably arranged substantially perpendicularly to each other and extend substantially normal to each other. By substantially normal also deviations from a right angle of +/−10°, especially of +/−5°, especially of +/−2° are to be understood in this context.

In a top view onto the airbag, the longitudinal axis extends through a 6 o'clock position and a 12 o'clock position of the airbag.

The transverse axis preferably extends through a 3 o'clock position and a 9 o'clock position of the airbag.

The given 3, 6, 9 and 12 o'clock positions of the airbag are defined with respect to the orientation of the airbag typically mounted and inflated in the steering wheel and the vehicle, respectively.

It is possible that at a/the 12 o'clock position of the airbag and/or extending from the middle to a/the 12 o'clock position of the airbag a gas discharge device is formed. A gas discharge device may consist of vents, as they are called. A so called vent enables gas to escape from the airbag in the inflated state. There are known, for example, so called self-adaptive vents (SAV) and/or flap vents. The airbag folded in accordance with the invention may comprise both a self-adaptive vent and a flap vent. Moreover, it is possible that the airbag comprises seams which tear when a particular stress/load is applied.

The airbag to be folded in accordance with the invention may further include a tether device, especially a restraint and/or tether strap, wherein the tether device, especially a restraint and/or a tether strap and/or a tether seam, is positioned so that if extends along the longitudinal axis or substantially in parallel to the longitudinal axis. This prevents strong twisting and/or kinking inside the airbag so that the tether device can work properly also in the inflated state of the airbag folded in accordance with the invention.

Prior to step a) an inflator and/or an airbag fixture may be placed, preferably centrally, in a clearance formed by the front airbag layer and the rear airbag layer. In other words, the clearance constitutes the airbag interior. Therein, preferably before the airbag is flatly spread, an inflator preferably having a circular cross-section and/or the airbag fixture have to be placed. The airbag fixture may be, for example, a holder plate including fasteners, especially screws and/or bolts, arranged thereon. Folding, especially zigzag folding, of the left lateral and/or right lateral airbag portions as well as furling of the upper airbag portion and/or the lower airbag portion preferably is performed such that the inflator and/or the airbag fixture are not displaced. Of preference, the rear airbag layer includes openings through which the fasteners of the airbag fixture can be guided.

When placing the airbag fixture, especially the fasteners of the airbag fixture, it is important to take care that they do not impair a/the tether device during positioning inside the airbag interior and inside the clearance, respectively.

It is further possible that an airbag sheath is provided. The airbag sheath is arranged on the rear airbag layer, preferably connected to the rear airbag layer. When carrying out the method, the airbag sheath is located beneath the rear airbag layer. The airbag sheath is preferably located between the support surface and the rear airbag layer. Especially preferred, the airbag sheath is not folded, i.e. neither folded nor furled, when the method of folding an airbag is implemented. The airbag sheath preferably remains flatly on the support surface when implementing the method according to the invention.

Especially when carrying out step b), between the left-hand lateral airbag portion and the right-hand lateral airbag portion a center strip which is not laid, especially not folded, is formed which extends especially on the longitudinal axis or in parallel to the longitudinal axis. That is to say that especially in step b) such non-laid, especially non-folded center strip is formed such that the inflator and/or the airbag fixture, for example, need not be displaced for folding the inflator.

Preferably in step b) for zigzag folding the left-hand lateral and/or right-hand lateral airbag portions, a first folding blade is aligned substantially in parallel to the longitudinal axis and placed substantially perpendicularly onto the front airbag layer so that a lateral edge of a/the center strip is formed, wherein subsequently the left-hand lateral and/or the right-hand lateral airbag portions, especially a 3 o'clock position portion and/or a 9 o'clock position portion of the airbag, is folded in the direction of the first folding blade so that the front airbag layer is laid over the first folding blade and at least one surface portion of the rear airbag layer is aligned substantially perpendicularly to the support surface.

The folding blade is considered to be such aid which is in the form of a ruler. By means of the height of the folding blade, i.e. the blade height, the width of a fold is defined. Preferably the folding blade has such length that the folding blade is longer than the length of the airbag. The length of the airbag is to be understood as the extension along the longitudinal axis of the airbag.

In a further method step which belongs to the step b) preferably a second folding blade is put against the surface portion of the rear airbag layer and subsequently the left-hand lateral airbag portion and/or the right-hand lateral airbag portion is laid over the second folding blade so that a first folding portion is formed between the first folding blade and the second folding blade and a first folding bend is formed over the second folding blade and adjacent to the first folding bend a second folding portion is formed.

The and/or connections stated in the claims 9 to 11 are to be understood to the effect that the method steps described there can be carried out for folding the left-hand lateral airbag portion and for folding the right-hand lateral airbag portion. Accordingly, the method steps of the claims 9 to 11 are carried out successively either with the left-hand lateral airbag portion or with the right-hand lateral airbag portion. Preferably both the left-hand lateral airbag portion and the right-hand lateral airbag portion are folded by the method steps according to the claims 9 to 11. Of preference, first the right-hand lateral airbag portion and subsequently the left-hand lateral airbag portion are folded. A process order deviating herefrom is possible, too.

A folding bend is considered to be the connecting point between two folding portions. Starting from the folding bend a fold opening is formed between two folding portions. Such fold opening extends in the state of the method step b) substantially perpendicularly to the support surface. Hence, due to the zigzag folding, a concertina-like folding is resulting which is formed to stand upright on the support surface.

In another sub-step of step b) preferably a third folding blade is put against the second folding portion and subsequently the left-hand lateral airbag portion and/or the right-hand lateral airbag portion is/are folded toward the third folding blade so that the front airbag layer is laid over the third folding blade and at least one surface portion of the rear airbag layer is aligned substantially perpendicularly to the support surface and subsequently a fourth folding blade is put against the surface portion of the rear airbag layer and after that the left-hand lateral airbag portion and/or the right-hand lateral airbag portion is/are laid over the fourth folding blade so that beneath the third folding blade a second folding bend is formed and between the third folding blade and the fourth folding blade a third folding portion is formed and above the fourth folding blade a third folding bend is formed and adjacent to the third folding bend a fourth folding portion is formed.

Preferably, for carrying out the method step b) plural folding blades are used. They may be inserted in holding fixtures arranged on the side of the airbag so that the individual folding blades need not be held by a person. Alternatively and/or additionally it is imaginable that merely two folding blades are used, with the previously used first folding blade, for example, being used as the third folding blade. The previously used second folding blade, for example, may be used as the fourth folding blade. For this purpose it is required, however, that the already formed folding portions and/or folding bends are caught by means of clips or similar holding fixtures, in other words, the third folding blade may be a third folding blade to be used.

Preferably the steps for zigzag folding including at least six folding blades are carried out so many times that at least five folding bends and at least six folding portions are formed.

The folding bends may also be referred to as folding edges and folds, respectively, and/or may be configured as folding edges and folds, respectively. Due to a relatively thick airbag material and the two-ply configuration during folding of the airbag, respectively, folding edges are not necessarily recognizable as such.

Of preference, prior to carrying out step c), the folding portions are turned over in the direction of the longitudinal axis such that the first folding portion rests on the center strip, wherein preferably the folding blades are additionally removed. In other words, it is provided that prior to carrying cut step c) the zigzag folds whose openings extend substantially perpendicularly to the support surface are folded over such that the openings of the zigzag folds extend substantially in parallel to the support surface. For this, the first folding portion rests on the center strip, especially on the non-laid and, resp., unfolded center strip. The folding blades can be removed prior to turning over the folding portions and/or after turning over the folding portions.

Preferably the folding portions and/or the folding bends are held together after turning over in the direction of the longitudinal axis by means of clips or similar fixing means.

Preferably the folding portions of the left-hand lateral airbag portion and the folding portions of the right-hand lateral airbag portion are turned over in the direction of the longitudinal axis so that the respective first folding portions rest on the center strip and preferably cover an/the inflator which is/was placed in a/the clearance formed by the front airbag layer and the rear airbag layer, in other words, both the folding portions of the left-hand lateral airbag portion and the folding portions of the right-hand lateral airbag portion are turned over in the direction of the longitudinal axis, with an inflator and/or an airbag fixture being covered by the left-hand lateral airbag portion and the right-hand lateral airbag portion. By covering in this context no direct resting on the inflator is to be understood. Above the inflator especially an upper airbag layer of the center strip is provided. Hence covering is to be understood as covering of the front airbag layer which is arranged in the area of the inflator and/or of the airbag fixture.

In step b) both the left-hand lateral airbag portion and the right-hand lateral airbag portion are folded, especially zigzag folded. It is possible that first the right-hand lateral airbag portion and then the left-hand lateral airbag portion is folded. A reverse order is imaginable as well, immediately before carrying out step c) possibly provided clips and/or fasteners have to be removed.

In total it is resulting that the left-hand lateral airbag portion and the right-hand lateral airbag portion may be configured to be axially symmetrical to the transverse axis of the airbag.

In step c) a left-hand and/or a right-hand lateral airbag portion, especially a 12 o'clock position portion and/or a 6 o'clock position portion of the airbag is furled starting from a lateral edge of the airbag, especially with the aid of a roll blade, in the direction of the transverse axis of the airbag, wherein preferably an/the inflator which is/was placed in a/the clearance formed by the front airbag layer and the rear airbag layer is not covered, at least in portions, by the upper airbag portion and/or the lower airbag portion.

The inflator in other words at least in portions remains free from the upper airbag portion and/or the lower airbag portion.

Preferably, first the upper airbag portion and then the lower airbag portion will be furled. An order of proceeding deviating herefrom is possible, too.

Furling of the upper airbag portion and/or the lower airbag portion may be performed especially by means of a roll blade. This again is a ruler-type element which, starting from a lateral edge of the airbag for furling the upper and/or lower airbag portions remains inside the furled airbag portion until a final position is reached.

The upper airbag portion and/or the lower airbag portion comprise portions of the folded left-hand lateral airbag portion and of the folded right-hand lateral airbag portion.

Preferably in step c) the upper airbag portion and/or the lower airbag portion, especially the upper airbag portion, is/are furled such that a tether device, especially a tether seam formed in or on the rear airbag layer, faces away from the support surface in a final position of the folded airbag.

In another embodiment of the invention if is possible that in step c) the upper airbag portion and/or the lower airbag portion, in particular the upper airbag portion, is/are furled so that a gas discharge device, in particular a gas discharge device formed in or on the rear airbag layer, faces away from the support surface in a final position of the folded airbag.

After carrying out step c), folding of an airbag sheath can be performed in a step d). For this purpose, the airbag sheath may be put around the folded airbag, for example.

The folded airbag may be positioned in a modulo casing. This is preferably effectuated along with an/the airbag sheath.

Within the scope of another aspect, the invention is based on the idea to state an airbag that was folded following an afore-mentioned method according to the invention. There are resulting advantages similar to those explained already in connection with the afore-mentioned method according to the invention.

Another independent aspect of the invention relates to a folded airbag, especially for a driver airbag module, comprising a front airbag layer that is connected at least in portions to a rear airbag layer.

In accordance with the invention, the folded airbag includes an upper airbag portion, a lower airbag portion, a left-hand lateral airbag portion and a right-hand lateral airbag portion, each of the left-hand lateral airbag portion and the right-hand lateral airbag portion being folded, especially zigzag folded, and each of the upper airbag portion and the lower airbag portion being furled toward the middle of the airbag. Concerning the terms "upper", "lower", "left-hand lateral" and "right-hand lateral", the foregoing explanations are referred to.

Preferably the left-hand lateral airbag portion or the right-band lateral airbag portion is folded, especially zigzag folded, such that a first folding portion of each of the left-hand lateral airbag portion and of the right-hand lateral airbag portion rests on a center strip of the front airbag layer so that an inflator placed or adapted to be placed in a clearance formed by the front airbag layer and the rear airbag layer is covered at least in portions by the left-hand lateral airbag portion and/or the right-hand lateral airbag portion. In this respect, advantages similar to those stated already in connection with the methods according to the invention are resulting.

It is further possible that an/the inflator placed or adapted to be placed in a/the clearance formed by the front airbag layer and the rear airbag layer is not covered at least in portions, preferably completely, by the upper and/or lower airbag portions. In other words, the inflator is free of the upper and/or lower airbag portion at least in portions, preferably completely. In this context, covering is equally intended to mean that the material of each of the mentioned airbag portions does not rest directly on the inflator but on the front airbag layer formed above the inflator.

Preferably the upper airbag portion and/or the lower airbag portion, especially the upper airbag portion, is/are furled so that a tether device, especially a tether seam formed in or on the rear airbag layer, faces away from the support surface in a final position of the folded airbag or in the mounted state faces a vehicle occupant or the driver, respectively.

In another embodiment of the invention it is possible that the upper airbag portion and/or the lower airbag portion, especially the upper airbag portion, is/are furled such that a gas discharge device, especially a gas discharge device formed in or on the rear airbag layer, faces away from the support surface in a final position of the folded airbag and/or is configured to be symmetrical to the longitudinal axis even in the furled state.

Another independent aspect of the invention relates to an airbag module, especially for arrangement in a steering wheel, comprising an airbag according to the invention and/or an airbag that was folded following a method according to the invention. The airbag module further comprises an inflator for inflating the airbag.

There are resulting advantages similar to those already stated in connection with the method according to the invention for folding an airbag and/or in connection with the airbag folded according to the invention.

Another independent aspect of the invention relates to a vehicle safety system, especially a driver airbag module, comprising an airbag folded according to the invention and/or comprising an airbag folded following a method according to the invention and/or comprising an airbag module according to the invention, and wherein there are provided at least one sensor unit for detecting data as well as an electronic decision-making unit which is suited, incorporating the data detected by the sensor unit, for defining the presence of a trigger case for the airbag module and/or for transmitting a trigger signal to the airbag module. There are resulting advantages similar to those already stated in connection with the method for folding an airbag according to the invention and/or with the airbag module according to the invention.

BRIEF DESCRIPTION OF THE DRAWINGS

Hereinafter the invention shall be illustrated by way of embodiments with reference to the enclosed schematic drawings, in which.

DESCRIPTION

Figure 1A:
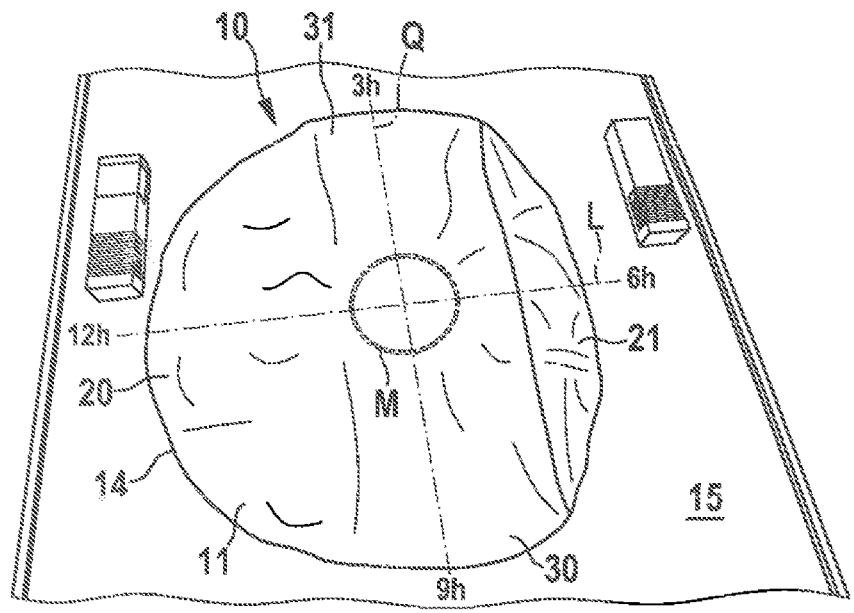
FIGS. 1a and 1b show an airbag spread on a support surface in a front view and a rear view.

Hereinafter the same reference numerals are used for equal and equally acting parts.

Figure 1B:
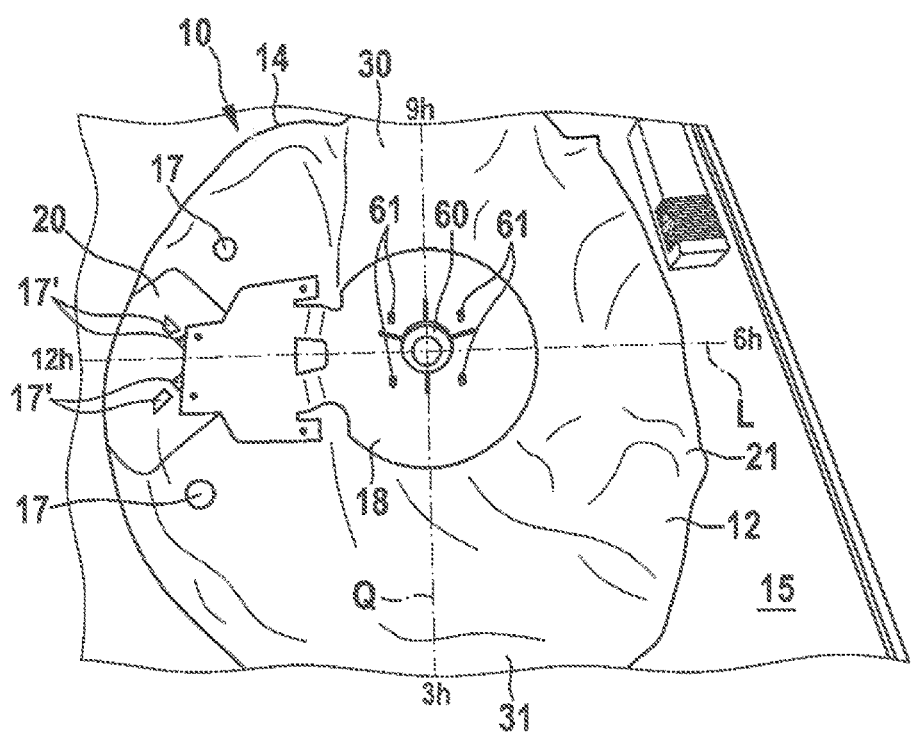

In FIGS. 1a and 1b an airbag 10 is shown in a state spread on a support surface 15. The support surface 15 is the surface of a working table or a desk, for example.

The airbag 10 includes a front airbag layer 11 and a rear airbag layer 12. The rear airbag layer 12 is visible in FIG. 1b. In FIG. 1a the front airbag layer 11 is visible which is connected, especially stitched and/or welded, at least in portions to the rear airbag layer 12. When flatly spreading the airbag 10 onto the support surface 16, care has to be taken that no forces are applied to the seams intended to tear in the inflated state of the airbag 10 during the subsequent method steps.

The representations of FIGS. 1a and 1b correspond to a lateral perspective view onto the flatly spread airbag 10. A person folding the airbag 10 lying in front of her/him would stand in the representations at the respective right image border, for example. A longitudinal axis L and a transverse axis Q are visible. The airbag 10 may be divided into an upper airbag portion 20, a lower airbag portion 21, a left-hand lateral airbag portion 30 and a right-hand lateral airbag portion 31. The given 3, 6, 9 and 12 o'clock positions of the airbag 10 are defined with respect to the orientation of the airbag typically mounted and inflated in the steering wheel and the vehicle, respectively.

The longitudinal axis L extends through the 6 o'clock position and through the 12 o'clock position. The transverse axis Q, on the other hand, extends through the 3 o'clock position and the 9 o'clock position of the airbag 10. The longitudinal axis L and the transverse axis Q are substantially perpendicular to each other.

In a clearance formed by the front airbag layer 11 and the rear airbag layer 12 an inflator 60 is already provided. The latter is preferably centrally placed. The middle M of the airbag 10 is evident by way of a circular seam. When positioning the inflator 60 as well as an airbag fixture, care has to be taken that neither the inflator 60 nor an airbag fixture does impair the tether device.

It is evident in FIG. 1b that the inflator 60 can be fastened in a module casing (not shown) by means of four fixing means 61. The fixing means 61 are of the screw type. The rear airbag layer 12 includes four apertures through which the fixing means 61 can be passed. An airbag sheath 18 is equally visible. The latter initially is not folded and rather remains lying on the support surface 15. During the folding operation the airbag sheath 18 is arranged between the support surface 15 and the rear airbag layer 12 of the airbag 10.

A gas discharge device may be formed at the 12 o'clock position of the airbag 10 and, respectively, extending from the middle M to the 12 o'clock position of the airbag 10. In the present case plural gas discharge orifices 17, 17' are formed in the rear airbag layer 12. The gas discharge orifices 17 are circular and are arranged to be axially symmetrical to the longitudinal axis L. The gas discharge orifices 17' have a polygonal shape and are equally arranged to be axially symmetrical to the longitudinal axis L. The gas discharge orifices 17' are arranged in V-shape with respect to the longitudinal axis L.

After having spread the airbag 10 flatly on the support surface 15, in a step b) the right-hand lateral airbag portion 31 and the left-hand lateral airbag portion 30 are zigzag folded in the direction of the longitudinal axis L of the airbag 10.

Figure 2:
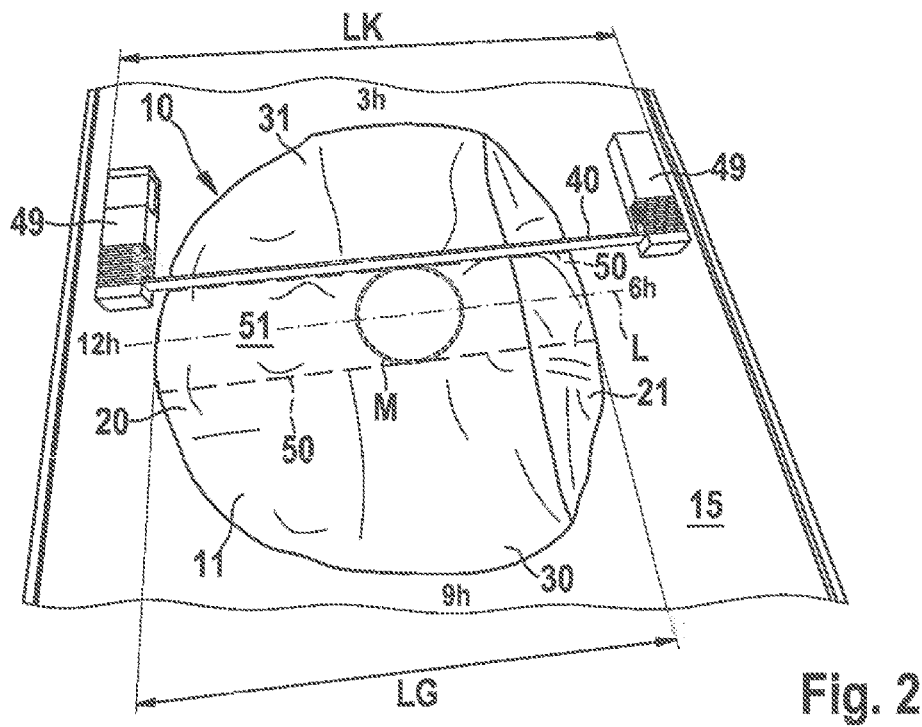
FIG. 2 to 5c show individual steps of the method according to the invention for folding an airbag.

As is illustrated in FIG. 2, a first folding blade 40 is aligned substantially in parallel to the longitudinal axis L. The first folding blade 40 is put substantially perpendicularly onto the front airbag layer 11. Hence a lateral edge 50 of a center strip 51 extending in parallel to the longitudinal axis L is formed. The center strip 51 is non-laid, especially non-folded.

The first folding blade 40 is a ruler-type aid. The length LK of the first folding blade 40 is longer than the length LG of the airbag 10. The first folding blade 40 may be inserted in holding fixtures 49 arranged on the right and on the let of the airbag 10.

In a further method step, the right-hand lateral airbag portion 31, especially the portion of the airbag 10 comprising the 3 o'clock position, is folded in the direction of the first folding blade 40 so that the front airbag layer 11 is laid over the first folding blade 40 and at least one surface portion of the rear airbag layer 12 is aligned substantially perpendicularly to the support surface 15.

Figure 3:
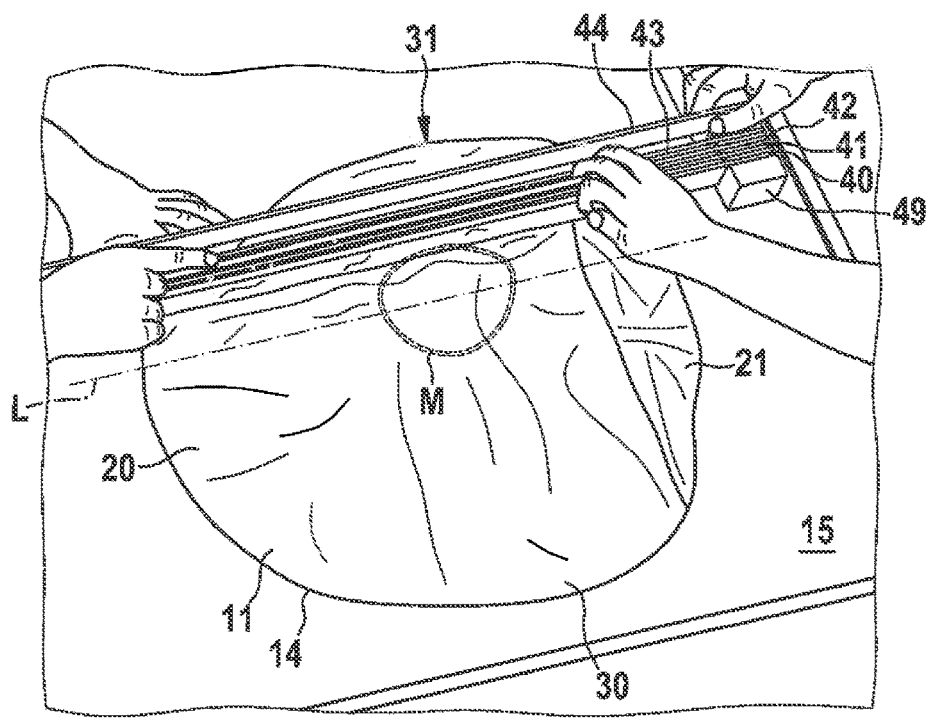

In FIG. 3 the airbag 10 is shown in a viewing direction from the 9 o'clock position. As can be inferred from the Figure, the folding operation is carried out by plural folding blades, i.e. the first folding blade 40, the second folding blade 41, the third folding blade 42, the fourth folding blade 43, the fifth folding blade 44 as well as a sixth folding blade (not shown). Above and, resp., beneath the folding blades folding bends are formed (cf. FIG. 4b in this context). Said folding bends interconnect the individual folding portions. The zigzag folding operation in connection with the right-hand lateral airbag portion 31 is equally carried out with the left-hand lateral airbag portion 30.

Figure 4A:
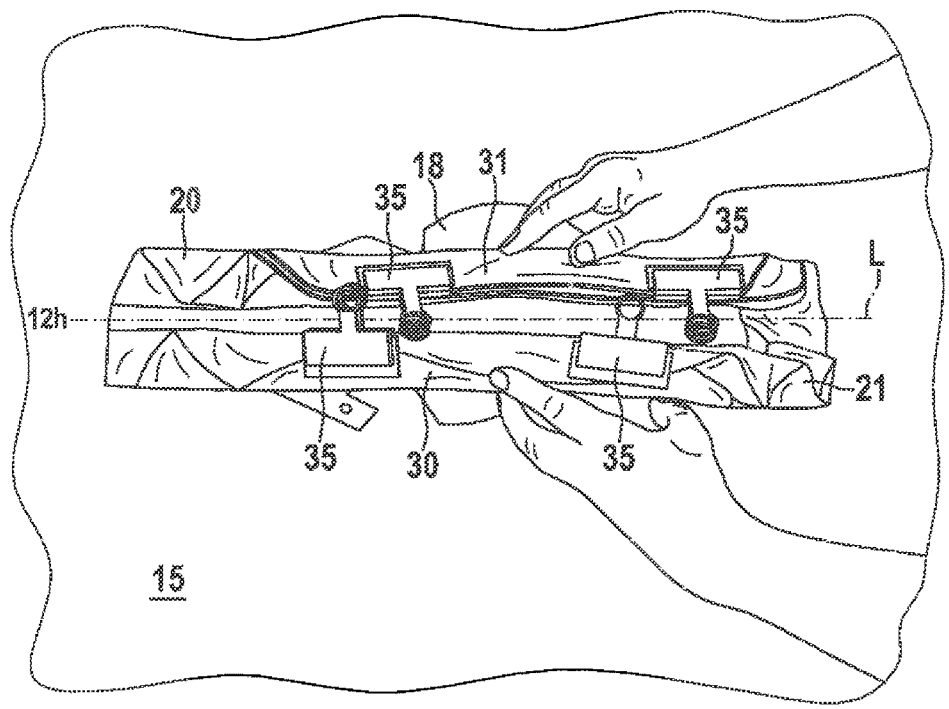

FIG. 4a illustrates that both the right-hand lateral airbag portion 31 and the left-hand lateral airbag portion 30 are folded, especially zigzag folded, in the direction of the longitudinal axis L of the airbag 10. It is shown in FIG. 3 that the openings of the foldings are formed perpendicularly to the support surface 15, wherein one folding consists of a folding bend and two folding portions. According to FIG. 4a, the folding portions are turned over in the direction of the longitudinal axis L so that the first folding portion in each case rests on the center strip 51. The folding blades 40-44 are already removed in this method step. The folding portions are preferably held together by means of clips 35 at least in this method step so that the right-hand lateral airbag portion 321 and the left-hand lateral airbag portion 30 can be simply turned over in the direction of the longitudinal axis L.

Figure 4B:
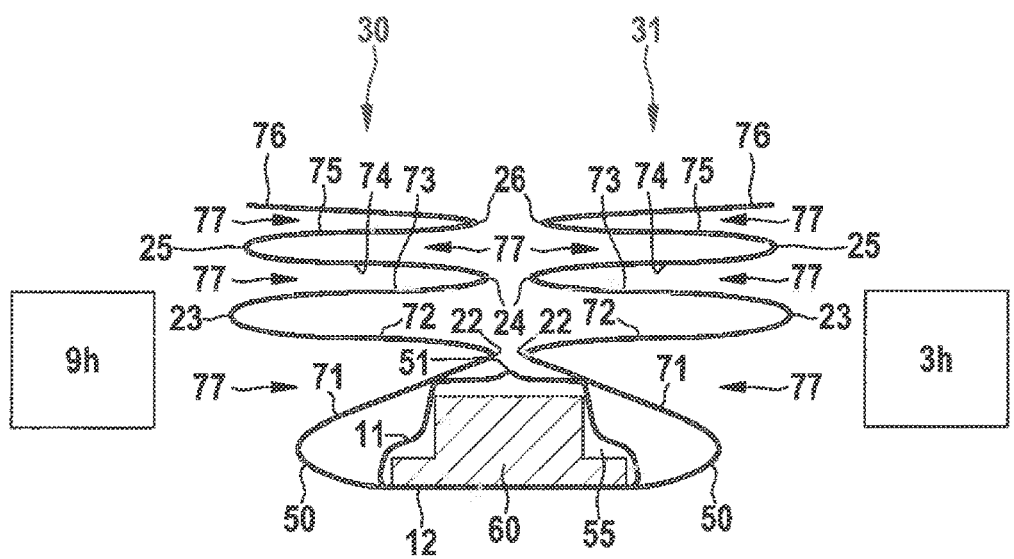

In the sectional view of FIG. 4b, the right-hand lateral airbag portion 31 and the left-hand lateral airbag portion 30 are illustrated in the folded state. In the clearance 55 formed by the front airbag layer 11 and the rear airbag layer 12 an inflator 60 is placed. There is also evident the center strip 51 which is folded or non-folded, respectively. The center strip 51 is constituted by the two lateral edges 50 on each of which folding blades stood upright in the previous method steps. The left-hand lateral airbag portion 30 includes a first folding bend 22, a second folding bend 23, a third folding bend 24, a fourth folding bend 25 as well as a sixth folding bend 26.

There are equally evident the first folding portion 71, the second folding portion 72, the third folding portion 73, the fourth folding portion 74, the fifth folding portion 75 as well as the sixth folding portion 76. The folding portions 71-76 are interconnected by the folding bends 22-26. In total five folding bends 22-28 as well as six folding portions 71-76 are formed by six folding blades 40-45. The openings 77 of the foldings are configured to be parallel to the support surface 15 according to the representation of FIG. 4b.

The right-hand lateral airbag portion 31, too, includes five folding bends 22-26 as well as the folding portions 71-78. Also in this respect it is true that the openings 77 of the folds are configured to be parallel to the support surface 15. The respective first folding portions 71 of the left-hand lateral airbag portion 30 as well as of the right-hand lateral airbag portion 31 are turned over in the direction of the lateral axis L such that they rest on the center strip 51. The inflator 60 is covered by the respective first folding portions 71, wherein this relates especially to the portion of the front airbag layer 11 that is configured above the inflator 60.

Figure 5A:
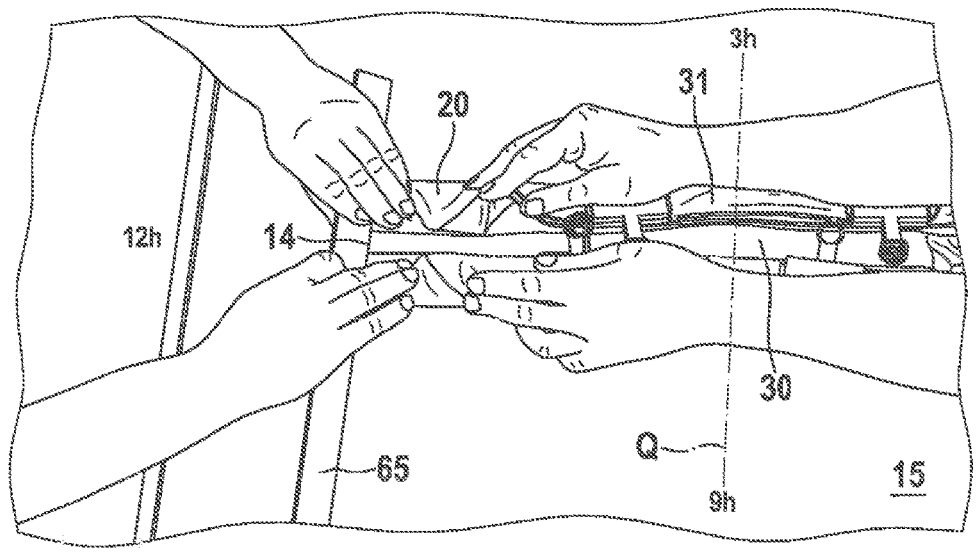
FIG. 5d shows a folded airbag.

FIG. 5a illustrates a sub-step of step c). Accordingly, the upper airbag portion 20, especially the 12 o'clock position portion of the airbag 10, is furled starting from the lateral edge 14 of the airbag 10 by means of a roll blade 65 especially in the form of a ruler in the direction of the transverse axis Q of the airbag 10.

Figure 5B:
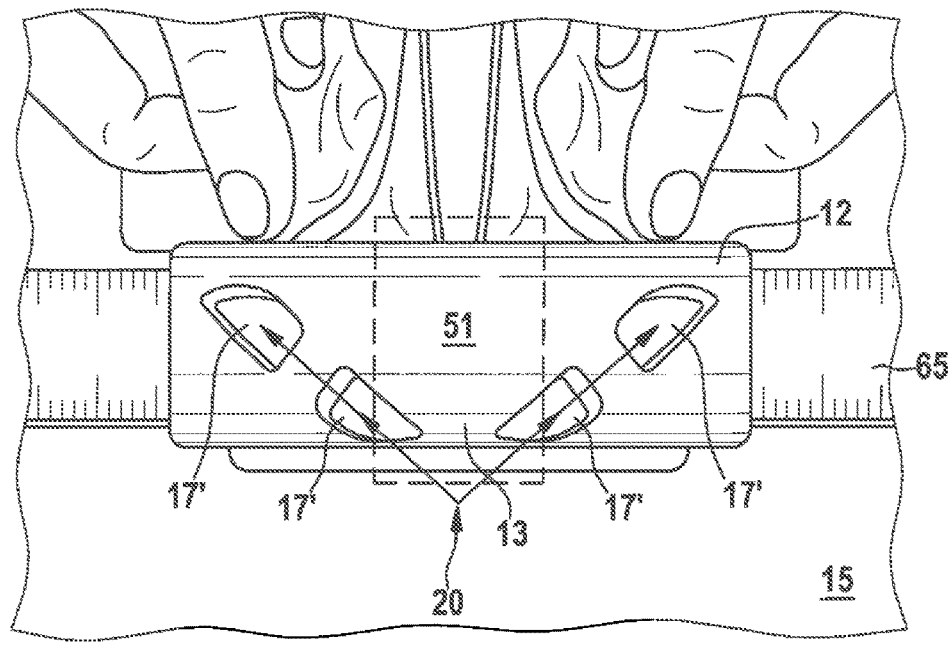

In FIG. 5b a view onto the 12 o'clock position is shown. A correct furled position of the gas discharge orifices 17' has to be observed. The latter are arranged to be axially symmetrical to the longitudinal axis L even after furling. The gas discharge orifices 17' are provided especially on the rear airbag layer 12 in the area of the non-laid and, resp., non-folded center strip 51. The tether device 13 is configured on the longitudinal axis L or, resp., in parallel to the longitudinal axis L. During furling care has to be taken that the tether device is located on the longitudinal axis L or, resp., in parallel to the longitudinal axis L even after the furling operation.

Figure 5C:
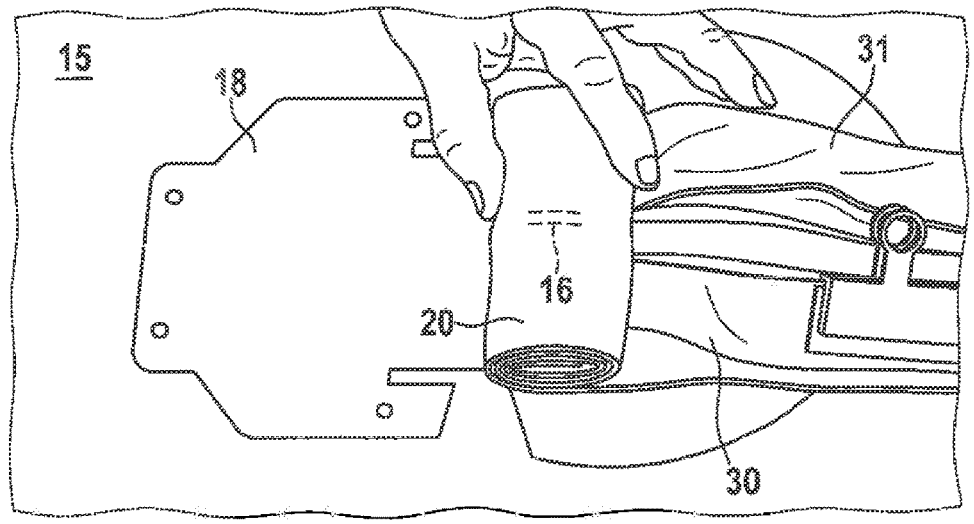

It is represented in FIG. 5c that a tether device, especially a tether seam 16 formed within or on the rear airbag layer 12 faces away from the support surface 15 in a final position of the folded airbag 100.

Figure 5D:
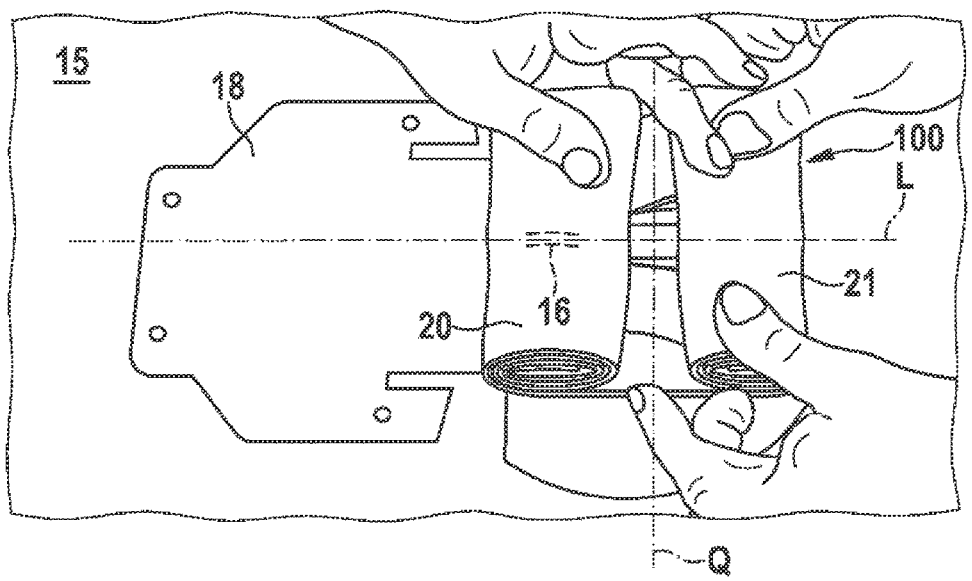

FIG. 5d illustrates that the upper airbag portion 20 is not completely furled. Rather, the inflator 60 is not covered, at least in portions, by the upper airbag portion 20. In other words, the inflator 60, especially the portion of the front airbag layer 11 and, resp., the portions of the left-hand lateral airbag portion 30 as well as of the right-hand lateral airbag portion 31 being arranged above the inflator 60, remains free from the upper airbag portion 20.

According to the way illustrated in FIGS. 5a and 5b, also the lower airbag portion 21 is furled in the direction of the transverse axis Q of the airbag 10. The inflator 60, especially the portion of the front airbag layer 11 arranged above the inflator 60 and, resp., the portions of the left-hand lateral airbag portion 30 and of the right-hand lateral airbag portion 31 arranged above the inflator 60, at least in portions remain free from the lower airbag portion 21.

FIG. 5d illustrates the furled state of the upper airbag portion 20 and of the lower airbag portion 21. This state constitutes a folded airbag 100. Each of the left-hand lateral airbag portion 30 and the right-hand lateral airbag portion 31 is zigzag folded. The upper airbag portion 20 and the lower airbag portion 21 are furled in the direction of the middle and, respectively, in the direction of the transverse axis Q of the airbag 10. The folded airbag 100 may be positioned in a module casing. The folded airbag 100 requires relatively little space. It is additionally characterized by a directed inflating behavior.

LIST OF REFERENCE NUMERALS 10 airbag
11 front airbag layer
12 rear airbag layer
13 tether device
14 lateral edge
15 support surface
16 tether seam
17,17' gas discharge orifice
18 airbag sheath
20 upper airbag portion
21 lower airbag portion
22 first folding bend
23 second folding bend
24 third folding bend
25 fourth folding bend 26 fifth folding bend
30 left-hand lateral airbag portion
31 right-hand lateral airbag portion
35 clip
40 first folding blade
41 second folding blade
42 third folding blade
43 fourth folding blade
44 fifth folding blade
49 holding fixture
50 lateral edge
51 center strip
55 clearance
60 inflator
61 fixing means
65 roll blade
71 first folding portion
72 second folding portion
73 third folding portion
74 fourth folding portion
75 fifth folding portion
76 sixth folding portion
77 opening of folding
100 folded airbag
L longitudinal axis
LG length of airbag
LK length of folding blade
LS perpendicular
M middle of airbag
Q transverse axis

The invention claimed is:

1. A method of folding an airbag (10) for a driver airbag module comprising a front airbag layer (11) connected at least in portions to a rear airbag layer (12), the method comprising the steps of:
   a) flatly spreading the airbag (10) on a support surface (15) so that the front airbag layer (11) comes to rest on the rear airbag layer (12),
   b) zigzag folding, each of a left-hand lateral airbag portion (30) and a right-hand lateral airbag portion (31) multiple times in the direction of a longitudinal axis (L) of the airbag (10),
   c) furling each of an upper airbag portion (20) and a lower airbag portion (21) in the direction of a transverse axis (Q) of the airbag (10), wherein the longitudinal axis (L) and the transverse axis (Q) extend substantially perpendicularly to each other, wherein the longitudinal axis (L) extends through a 6 o'clock position and a 12 o'clock position of the airbag (10) and wherein the transverse axis (Q) extends through a 3 o'clock position and a 9 o'clock position of the airbag (10), wherein the airbag (10) includes at least one of:
   at least one gas discharge device (17, 17') formed at the 12 o'clock position of the airbag (10) and/or extending from the middle (M) to the 12 o'clock position of the airbag (10), and
   a tether device (13) positioned so that it extends on or substantially parallel to the longitudinal axis (L), wherein prior to the step a) at least one of an inflator (60) and an airbag fixture is placed in a clearance (55) formed by the front airbag layer (11) and the rear airbag layer (12).

2. The method according to claim 1, wherein the tether device comprises at least one of a tether seam (16) formed within or on the rear airbag layer (12), a restraint, and a tether strap.

3. The method according to claim 1, wherein between the left-hand lateral airbag portion (30) and the right-hand lateral airbag portion (31) a non-reversed center strip (51) extending on or substantially parallel to the longitudinal axis (L) is formed, and wherein step b) comprises, for each of the left-hand lateral airbag portion (30) and right-hand lateral airbag portion (31), zigzag folding the lateral airbag portions (30, 31), respectively, by:
   aligning a first folding blade (40) substantially in parallel to the longitudinal axis (L) and positioned substantially perpendicularly onto the front airbag layer (11) so that a lateral edge (50) of the center strip (50) is formed;
   folding the lateral airbag portion (30, 31) in the direction of the first folding blade (40) so that the front airbag layer (11) is laid over the first folding blade (40) and at least one surface portion of the rear airbag layer (12) is aligned substantially perpendicularly to the support surface (15);
   positioning a second folding blade (41) against the surface portion of the rear airbag layer (12);
   laying the lateral airbag portion (30, 31) over the second folding blade (41) so that between the first folding blade (40) and the second folding blade (41) a first folding portion (71) is formed and above the second folding blade (41) a first folding bend (22) is formed and adjacent to the first folding bend (22) a second folding portion (72) is formed;
   positioning a third folding blade (42) against the second folding portion (72);
   folding the lateral airbag portion (30, 31) in the direction of the third folding blade (42) so that the front airbag layer (11) is laid over the third folding blade (42) and at least one surface portion of the rear airbag layer (12) is aligned substantially perpendicularly to the support surface (15);
   positioning a fourth folding blade (43) against the surface portion of the rear airbag layer (12) and subsequently laying the lateral airbag portion (30, 31) over the fourth folding blade (43) so that beneath the third folding blade (42) a second folding bend (23) is formed, between the third folding blade (42) and the fourth folding blade (43) a third folding portion (73) is formed, above the fourth folding blade (43) a third folding bend (24) is formed, and adjacent to the third folding bend (24) a fourth folding portion (74) is formed; and
   wherein prior to carrying out step c) the folding portions (71, 72, 73, 74, 75, 76) are turned over in the direction of the longitudinal axis (L) such that the first folding portion (71) rests on the center strip (51), and the folding blades (40, 41, 42, 43, 44) are removed, wherein the folding portions (71, 72, 73, 74, 75, 76) covers the at least one of an inflator (60) and an airbag fixture which was placed in the clearance (55) formed by the front airbag layer (11) and the rear airbag layer (12).

4. The method according to claim 3, wherein the left-hand lateral airbag portion (30) comprises a 9 o'clock position of the airbag (10) and the right-hand lateral airbag portion (31) comprises a 3 o'clock portion of the airbag (10).

5. The method according to claim 3, wherein step c) comprises furling the upper airbag portion (20) and the lower airbag portion (21) in the direction of the transverse axis (Q) of the airbag (10) starting from a lateral edge (14), wherein the at least one of an inflator (60) and an airbag fixture which was placed in the clearance (55) formed by the front airbag layer (11) and the rear airbag layer (12) at least in portions is not covered by at least one of the upper airbag portion (20) and lower airbag portion (21), and wherein step c) comprises furling at least one of the upper airbag portion (20) and the lower airbag portion (21) so that the tether device faces away from the support surface (15) in a final position of the folded airbag (10).

6. The method according to claim 5, wherein furling comprises furling by means of a roll blade (65).

7. The method according to claim 5, wherein the upper airbag portion (20) comprises a 12 o'clock position of the airbag (10) and the lower airbag portion (21) comprises a 6 o'clock portion of the airbag (10).

8. An airbag folded according to the method of claim 1.

9. An airbag module comprising the airbag according to claim 8 and an inflator for inflating the airbag.

10. A vehicle safety system comprising an airbag module according to claim 9, and comprising at least one sensor unit for detecting data as well as an electronic decision-making unit which is suited, incorporating the data detected by the sensor unit, for defining the presence of a trigger case for the airbag module and/or for transmitting a trigger signal to the airbag module.

11. The method according to claim 1, wherein neither the upper airbag portion (20) nor the lower airbag portion (21) is folded in the direction of the transverse axis (Q) of the airbag (10).

12. The method according to claim 1, wherein neither the left-hand lateral airbag portion (30) nor the right-hand lateral airbag portion (31) is rolled in the direction of the longitudinal axis (L) of the airbag (10).

13. A folded airbag (100) comprising a front airbag layer (11) which is connected at least in portions to a rear airbag layer (12), forming an upper airbag portion (20), a lower airbag portion (21), a left-hand lateral airbag portion (30) and a right-hand lateral airbag portion (31), wherein each of the left-hand lateral airbag portion (30) and the right-hand lateral airbag portion (31) are zigzag folded multiple times and each of the upper airbag portion (20) and the lower airbag portion (21) are furled in the direction of the middle (M) of the airbag (10).

14. The airbag (100) according to claim 13, wherein the left-hand lateral airbag portion (30) and the right-hand lateral airbag portion (31) are folded so that a first folding portion (71) of each of the left-hand lateral airbag portion (30) and the right-hand lateral airbag portion (31) rests on a center strip (51) of the front airbag layer (11) such that an inflator (60) placed or adapted to be placed in a clearance (55) formed by the front airbag layer (11) and the rear airbag layer (12) is covered at least in portions by the left-hand lateral airbag portion (30) and/or the right-hand lateral airbag portion (31).

15. The airbag according to claim 14, wherein the inflator (60) which is placed or adapted to be placed in the clearance (55) formed by the front airbag layer (11) and the rear airbag layer (12) is not covered at least in portions by the upper airbag portion (20) and/or the lower airbag portion (21), and wherein the upper airbag portion (20) and/or the lower airbag portion (21) is furled so that a tether device (13) faces away from the support surface (15) in a final position of the folded airbag (10).

16. The airbag according to claim 15, wherein the tether device (13) comprises a tether seam (16) formed within or on the rear airbag layer (12).

17. An airbag module comprising the airbag (100) according to claim 13 and an inflator (60) for inflating the airbag.

18. A vehicle safety system comprising an airbag module according to claim 17, and comprising at least one sensor unit for detecting data as well as an electronic decision-making unit which is suited, incorporating the data detected by the sensor unit, for defining the presence of a trigger case for the airbag module and/or for transmitting a trigger signal to the airbag module.

19. The airbag (100) according to claim 13, wherein neither the left-hand lateral airbag portion (30) nor the right-hand lateral airbag portion (31) is rolled in the direction of the middle (M) of the airbag (100).

20. The airbag (100) according to claim 13, wherein neither the upper airbag portion (20) nor the lower airbag portion (21) is folded in the direction of the middle (M) of the airbag (100).

\* \* \* \* \*